United States Patent [19]

Sawada et al.

[11] Patent Number: 4,839,879
[45] Date of Patent: Jun. 13, 1989

[54] METHOD FOR RECORDING DATA ON NON-DEFECTIVE SECTORS OF AN OPTICAL DISK

[75] Inventors: Kaname Sawada, Yokohama; Kazuo Suzuki, Funabashi; Shinji Hasunuma, Tokyo; Eizo Katayama, Yokohoma; Motoyasu Ohno, Itabashi; Tsukasa Kanazawa, Tokyo; Keiji Ueki, Yokohama, all of Japan

[73] Assignee: Matsushita Graphic Communication Systems, Inc., Tokyo, Japan

[21] Appl. No.: 90,104

[22] Filed: Aug. 27, 1987

[30] Foreign Application Priority Data

Sep. 3, 1986 [JP]  Japan .................................. 61-207258

[51] Int. Cl.⁴ .............................................. G11B 7/00
[52] U.S. Cl. ..................................................... 369/54
[58] Field of Search ...................... 369/54, 59, 275, 58, 369/32; 371/13, 38

[56] References Cited

U.S. PATENT DOCUMENTS

| 4,308,612 | 12/1981 | Miyauchi et al. | 369/54 |
|---|---|---|---|
| 4,494,226 | 1/1985 | Hazel et al. | 369/54 |
| 4,534,031 | 8/1985 | Jewer | 369/59 |
| 4,545,044 | 10/1985 | Satoh et al. | 369/54 |
| 4,546,462 | 10/1985 | Koishi et al. | 369/59 |
| 4,611,314 | 9/1986 | Ogata et al. | 369/59 |
| 4,677,606 | 6/1987 | Ogata et al. | 369/59 |
| 4,727,531 | 2/1988 | Ito et al. | 369/54 |
| 4,734,901 | 3/1988 | Murakami | 369/59 |
| 4,775,969 | 10/1988 | Osterlund | 369/59 |

Primary Examiner—Donald McElheny, Jr.
Attorney, Agent, or Firm—Wenderoth, Lind & Ponack

[57] ABSTRACT

An optical disc is subdivided into a plurality of concentric tracks. The tracks are further subdivided into a plurality of sectors. A method for recording data on such an optical disc includes the steps of designating some of the sectors as preliminary sectors and the remaining sectors as user sectors, identifying defective user sectors, and recording data corresponding to the defective sectors on the preliminary sectors.

2 Claims, 5 Drawing Sheets

TR1~4 ----- TRACK
RS1~8 ----- PRELIMINARY SECTOR

METHOD FOR RECORDING DATA ON NON-DEFECTIVE SECTORS OF AN OPTICAL DISK

BACKGROUND OF THE INVENTION

1. Field of the Invention

The present invention generally relates to a method for recording and reproducing information on and from a disk-shaped recording medium having a spiral track such as an optical disk, and, more particularly, to a recording and reproducing method for an optical disk, in which the information is recorded and then reproduced on and from the recording portions except for defective portions present in the recording medium.

2. Description of the Prior Art

Conspicuous developments have been recently made in the optical information recording/reproducing device, for instance, video disks and digital audio disks. Demands for the electronic filing devices have also been required, wherein the image information such as large quantities of a document is optically scanned in the two-dimensional mode to be photoelectrically converted. The photoelectrically converted image information is recorded on the image recording device such as an optical disk, and can be retrieved to obtain the reproduced image information, depending upon the requirement.

In the typical recording/reproducing method for the optical recording/reproducing device, while the optical disk having a recording plane made of a photo sensitive recording material is rotated, the information signal is recorded at a high density on the recording plane by the way of formations of concaves/convexes, or holes, changing the reflectivity, or the magnetizing direction, by irradiating an optical light spot such as a laser on the optical disk after focusing the laser light to produce the optical light spot having a diameter of approximately 1 $\mu$m (micrometer). Moreover, the information signal recorded on the optical disk is reproduced from the recording plane. In the optical disk device where the information is recorded in the spiral form, recording, or reproducing the information on the optical disk is performed by the optical head which is linearly moved in the radial direction of the optical head by employing the linear motor.

An optically detectable guide track is formed on a optical disk with the narrow track pitch so as to record the information at a high density. This guide track is selected in accordance with the contents of the information to be recorded, or the types of the signals to be recorded. In general, a guide track is formed in a spiral form, or a concentrical form with respect to a center of an optical disk. When the information to be recorded corresponds to an analogue mode, the guide track is normally supervised in the track unit. When, on the other hand, the information to be recorded is in a digital mode, such track-unit supervision becomes inconvenient because the length of the information is not decided which is different from the track unit supervision for the video signal. Accordingly, the information to be recorded is supervised with the track address and sector address by dividing each track into a plurality of information regions, which are so-called "sectors".

As a method of forming the guide track, the pregroup forming method has been usually employed where the guide track is formed in a groove form, and simultaneously both the track address and the sector address are formed in a concave-convex phase groove. In addition, the preformating method has been utilized where the refractive index of the photo-sensitive recording material is changed by employing a high power optical source prior to the information recording on the flat recording plane, and the guide track, track address and sector address are formed by changing the refractive index.

It is known that an optical disk has the merit of recording large quantities of information a higher density, but has the drawback that there are many defective regions where the data cannot be correctly recorded due to scratches or soil. As a result, the reliability on the data recording will be degraded since the data may be recorded on the defective regions of the optical disk.

Japanese patent KOKAI (unexamined) application No. 60-69865 (1985) discloses one solution for solving the above-described drawback of the conventional data recording method. That is to say, in accordance with the detection results of the detecting means for detecting the defect of the data block, the defect-block-data-address data representing the defect block is recorded on the predetermined recording area of the optical disk, while the information is recorded on the block other than the above-described defect block.

As another prior art solution for the recording and reproducing problems, Japanese patent KOKAI (unexamined) application No. 60-109034 discloses that in order to avoid the error operations in the defect areas, the sectors containing the defects are previously detected to produce the detection information which is stored in the memory of the disk controller, the optical spot passing through the sectors containing the defects is previously detected based upon the above-described information stored in the memory, and the recording and reproducing operations are performed by passing the optical spot through the other track adjacent to the track belonging to the above-described defective sector during a period of time substantially coincident with a time duration in which this optical spot passes through the sector containing the defects.

In general, the above-defined recording processes where the data recording is performed by preventing the data from being recorded on the defective regions, are mainly subdivided into the precheck system and the verify system. In accordance with the precheck system, prior to the information recording operation, the defective sector on the disk is prechecked, and then the information is recorded on only the non-defective sector while skipping the optical spot on the defective sector during the recording operation.

On the other hand, in the verify system, several sectors in the end portion of one track on one circle of the optical disk are allocated as the preliminary area, whereas the remaining portion of one track is allocated as the user's area. First, the information is recorded on the user's area. Thereafter, a check is made by reproducing the user's area to determine whether or not the information has been correctly recorded on the user's area. Then, the information erroneously recorded on the user's area of the sector is recorded on the above-described preliminary area. Finally the check is made by reproducing the preliminary area to determine whether or not the information is correctly recorded on the preliminary area.

In accordance with the above precheck system, even if the precheck results were correct, the information may not be correctly recorded when the information is actually recorded and thereafter reproduced. This precheck method results in poor reliability.

In the verify system, a time consuming problem may be present to accomplish the information recording process. That is to say, the information is recorded on the user's area of one track during the first rotation of the optical disk. Thereafter, the error detection is performed by reproducing the information just recorded on this user's area. However, no reproducing operation is effected during the second rotation since the head (i.e., optical pick up) cannot seek the track head of this track within a shorter time period during which the disk is rotated by an angle of $\theta$ (corresponding to the preliminary area) from the end point of the recording operation. In other words, the head seeking operation is completed during this second rotation. The user's area is reproduced during the third rotation of the optical disk so as to check the errors thereon. When the errors are detected, the information belonging to the error recording operation is recorded on the preliminary area located at the end portion of the same track during the third rotation. Subsequently, the head again seeks the track during the front half of the fourth rotation and reproduces the preliminary area to determine whether or not the error is present therein. No further description is made herein when the recording errors are present in the preliminary area.

As previously described in detail, the substantial time period, i.e., three rotations required even if no error is present in the recorded data. Moreover, a longer time period for four rotations is required when an error is detected from the recorded data (it should be noted that the time period required for rotating the optical disk during the five rotations in total is furthermore needed, taking account of the fact that one additional disk rotation is required so as to change the information recording process from the reproducing and error-detecting process during the fourth rotation to the succeeding track process). This causes the through-put to be lowered.

Another theme is addressing systems for acquiring the necessary information as quickly as possible with respect to the information recording of the optical disk.

In accordance with one conventional addressing method, the number of the sectors on which the information has been recorded is counted from the head portion of the optical disk, and the information recorded on the i-th sector is reproduced so as to obtain the necessary information (in the sector unit) which has been recorded in the i-th order.

In the second conventional addressing method, the information representing where the defective sectors are present in the optical disk is stored in the system. When the i-th recorded information (i.e., the information of the logic address) is acquired from this optical disk, it can be understood that the information "i" has been recorded on the specific sector of the specific track (i.e., the physical address of the optical disk) by referring to the positional information of the above-described defective sector. Accordingly, this information can be directly accessed.

A very lengthy time period is required to acquire the necessary information when employing the first addressing method. Since the number of the recorded sectors must be counted from the head track portion of the optical disk, the counting time becomes considerably long so as to acquire the necessary information recorded on the rear track position of the optical disk.

In accordance with the second addressing method by which the positional information representing the defective sectors is stored in the system, the necessary information can be quickly acquired. This addressing method may be preferably utilized in an apparatus where the recording medium is fixedly assembled with respect to the system, such as the fixed disk devices. However, this second addressing method is not a realistic method, since all the information representing the defective positions for all of the disks must be supervised by the respective optical disk devices. In such optical disk devices, a large number of the optical disks are freely set on a large number of the optical devices at random.

SUMMARY OF THE INVENTION

An object of the present invention is to provide a recording and reproducing method for an optical disk having a verify method capable of obtaining an detecting with a high reliability the defects, and wherein the time period required to perform a series of the information recording operation can be relatively shortened.

Another object of the invention is to provide a recording and reproducing method for an optical disk in which the information indicating the defect positions on the recording medium is not systematically supervised, but the averaged accessing time required to acquire the necessary information can be sufficiently shortened.

BRIEF DESCRIPTION OF THE DRAWINGS

These and other objects, and merits of the present invention will be sufficiently understood with reference to the following description and to the accompanying drawings, in which.

DETAILED DESCRIPTION OF THE PREFERRED EMBODIMENTS

Figure 1:
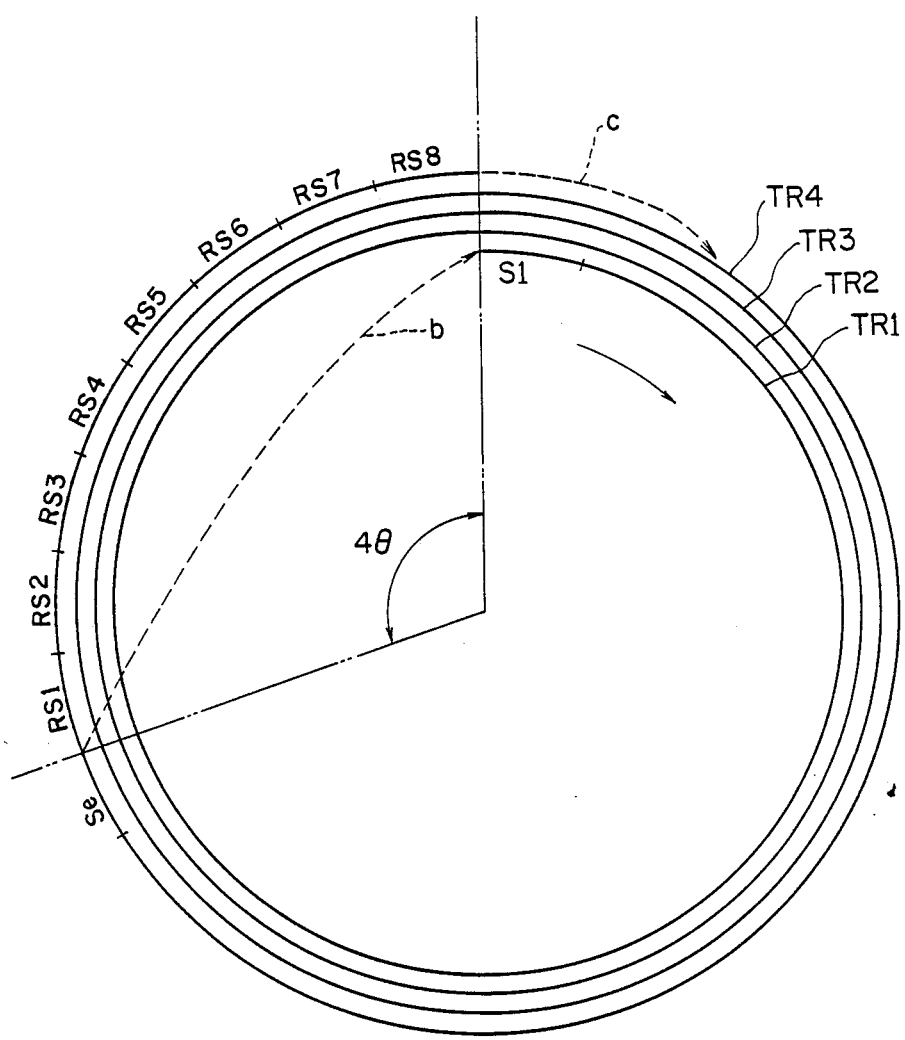
FIG. 1 is a schematic diagram of track arrangements of an optical disk so as to realize the recording method according to the invention.

Referring now to the drawings, preferred embodiments according to the invention will be described as follows.

Figure 2:
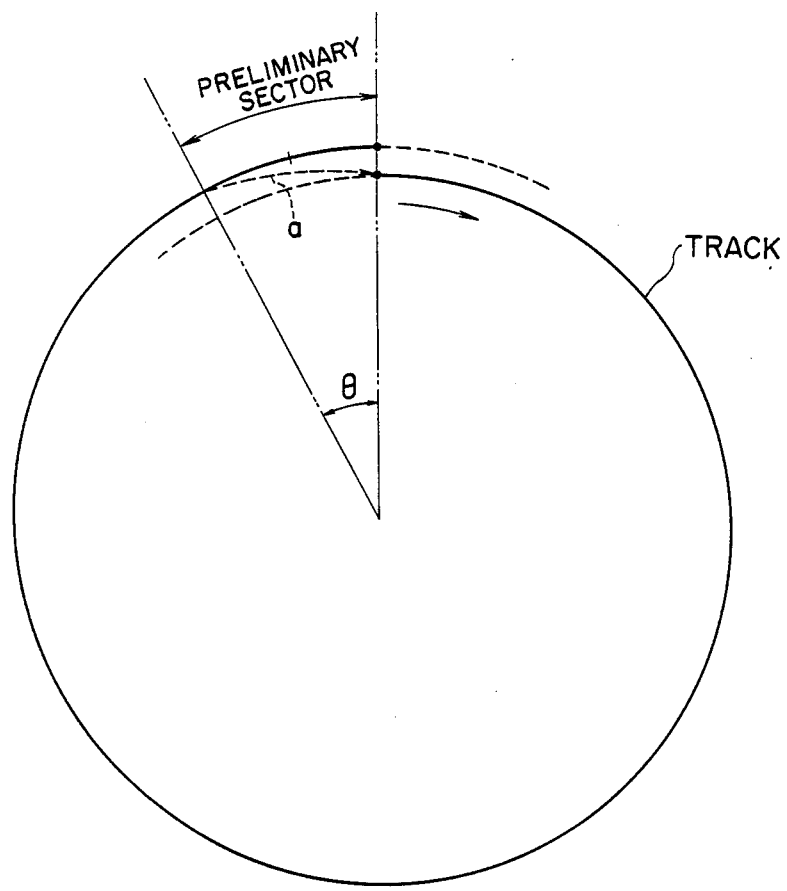
FIG. 2 is a schematic diagram of track arrangements of an optical disk used in the conventional recording method.

It should be noted that in the following preferred embodiments, a write-once type optical disk on which information can be recorded only once is employed as a recording/reproducing optical disk. In addition, the addresses for the tracks and sectors have been previously formatted on this write-once type optical disk, and a single supervising unit mainly consists of continuous four circle tracks TR1, TR2, TR3 and TR4, as illustrated in FIG. 1. Moreover, a single track essentially consists of two sectors, as illustrated in FIG. 2, which is the same as the conventional track arrangement. Accordingly, eight sectors for four tracks in total are prepared as preliminary sectors RS1 to RS8 (in the preliminary area) and these preliminary sectors are set after the end portion of the supervising unit, i.e., the fourth track TR4.

As shown in FIG. 2, an angle for covering two sectors is defined as "$\theta$". Consequently, another angle for covering the preliminary eight sectors (in the preliminary area) becomes "$4\theta$" as illustrated in FIG. 1. If the angular velocity of the optical disk is equal to "$\alpha$", the seek operation by the optical head cannot be completed within a time period of $(\theta \times \alpha)$. However, it can be accomplished within a time period of $(4\theta \times \alpha)$, i.e., four times longer than the first-mentioned time period. To establish the above-described relationship, it is determined in the preferred embodiments that a single supervising unit essentially consists of four tracks.

The sequential operation for recording the information on the optical disk will now be described. The information is sequentially recorded on the optical disk from the head sector S1 (first track TR1) till the final sector Se (fourth track TR4) of the user's area as the supervising unit while the optical disk is rotated from the first rotation to the fourth rotation. Within the final rotation time period of the fourth rotation defined by the angle of $4\theta$, the optical head is sought, as illustrated by an arrow "b", to the head sector S1.

The reproducing operation is sequentially performed by the optical head for the head sector S1 to final sector Se in the user's area of the above-described supervising unit while the optical disk is subsequently rotated from the fifth to eighth rotations. Then, a determination is made as to whether or not the information just recorded can be correctly recorded on the optical disk. If there is no error in the recording process, this sequence operation is completed within the eighth rotation of the optical disk.

If, however, the recording errors are detected, the information which has been erroneously recorded on the optical disk is sequentially recorded on the preliminary sectors RS1 to RS8 at the end portion of the eighth rotation of the optical disk.

Within the front half portion of the ninth rotation, the optical head is sought to the head side of the fourth track TR4, as illustrated by an arrow "C". Thereafter, those preliminary sectors RS1 to RS8 are reproduced during the rear half portion of the ninth rotation so as to check whether or not the recording errors are present. Even if such recording errors are detected, this sequence operation is accomplished within the ninth rotation of the optical disk.

As previously described, the sequential operation for recording the information may be completed within the eighth or ninth rotation of the optical disk in the preferred embodiment where a single supervising unit mainly consists of four tracks. In other words, one track of the optical disk can be retrieved within 2 or 2.25 rotations. To the contrary, according to the conventional method as shown in FIG. 2, one track of the optical disk can be retrieved within 3 or 4 rotations. As a result, the recording/reproducing processing rate can be greatly improved.

It should be understood that when the information is erroneously recorded on the preliminary sectors RS1 to RS8, this information is recorded on the remaining portions of the non-recorded preliminary sectors. Furthermore, if there is no portion of the preliminary sector on which the information can be recorded, the information may be recorded on a different preliminary region by way of the different recording sequential operation.

Figure 3:
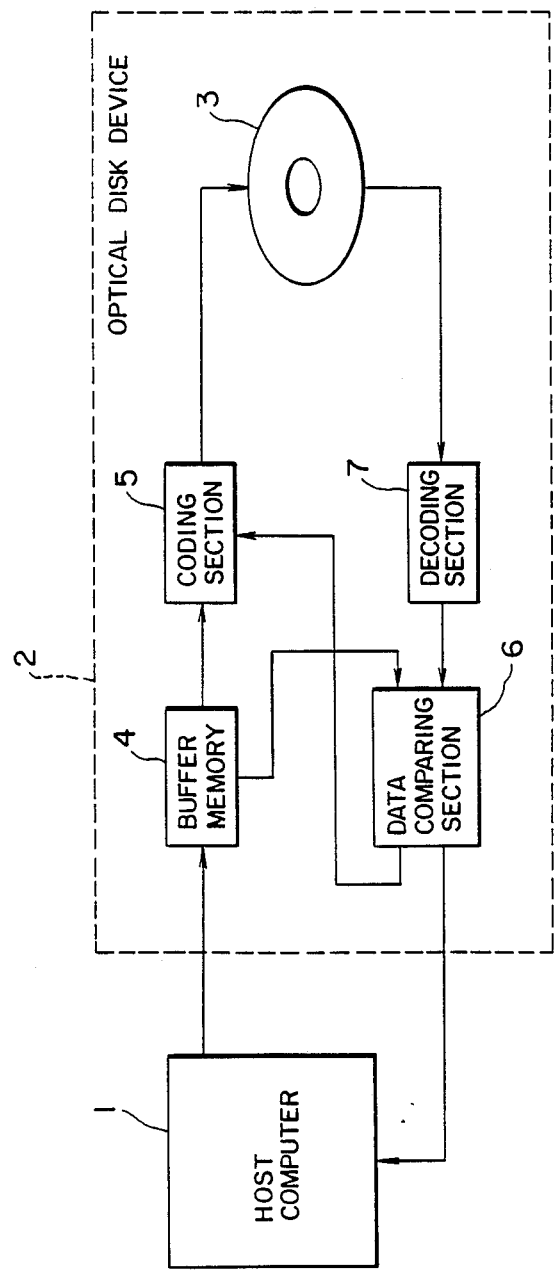
FIG. 3 is a schematic block diagram illustrating the system arrangement so as to realize the recording method according to the invention.

FIG. 3 shows a system for embodying the recording-/reproducing method according to the present invention.

The information to be recorded is transferred from a host computer 1 to an optical disk device 2 so as to be stored in a buffer memory 4. This information is converted in the form of the recording signal in a coding section 5, and thereafter recorded on the optical disk 3 in accordance with the above-described sequence. While the information recorded on the optical disk 3 is reproduced so as to check the recording results, the information reproduced from the optical disk 3 is input via a decoding section 7 to a comparing section 6. The comparing section 6 compares the reproduced information with the recorded information stored in the buffer memory 4 so as to check whether or not the recording errors are present. If recording errors exist, the corresponding information stored in the buffer memory 2 is recorded on the preliminary area. Another preferred embodiment according to the invention will now be described with reference to FIG. 4.

Figure 4:
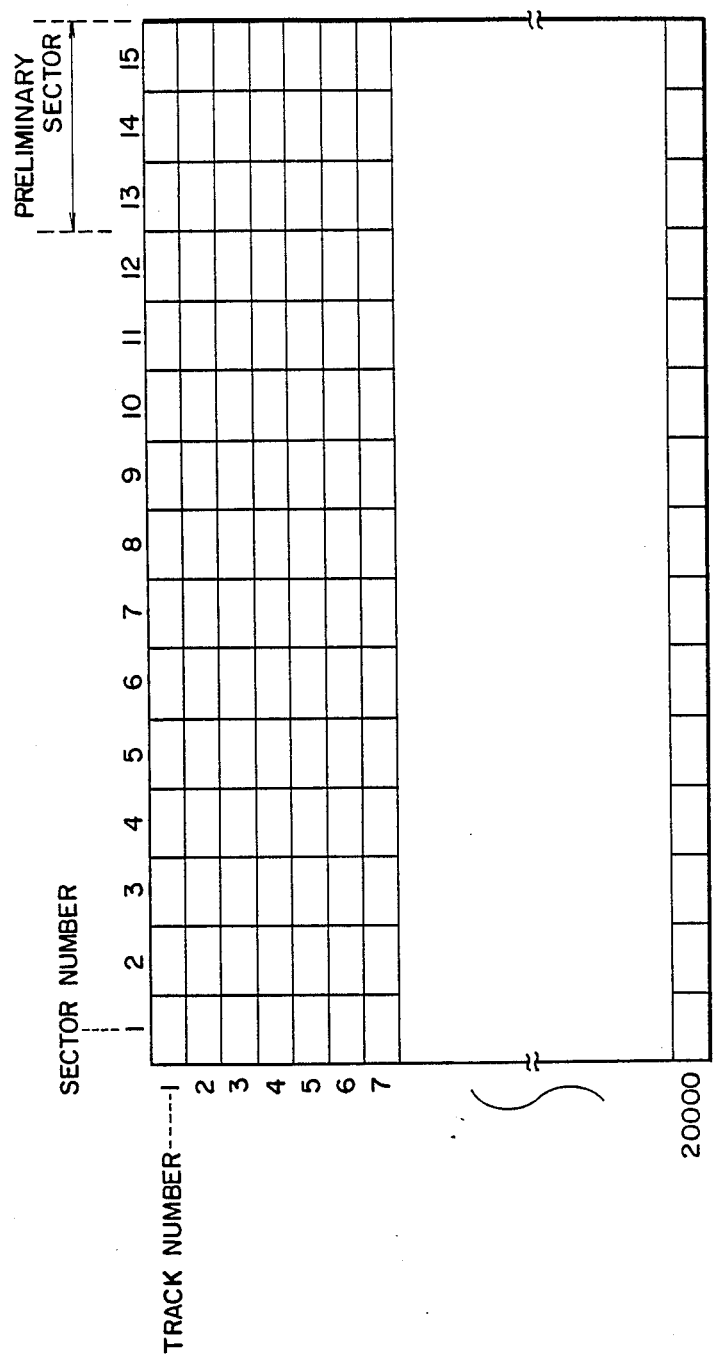
FIG. 4 schematically illustrates the user's area arrangement of the optical disk so as to realize the reproducing method according to the invention; and, FIG. 5 is a schematic block diagram illustrating the system arrangement so as to realize the reproducing method according to the invention.

The arrangement of the user's area within the information recording region of the optical disk has been previously formatted, as illustrated in FIG. 4. In the preferred embodiment, there are 20,000 tracks on the optical disk. These tracks are numbered by 1, 2, 3, ---, 20,000 from the inner circle toward the outer circle of the optical disk. Each of the tracks is subdivided into 15 sectors with equal intervals. These sectors are also numbered by 1, 2, 3, ---, 15 from the base point on the circle in the right direction. The last three sectors (sector numbers 13, 14 and 15) of each track are allocated to preliminary sectors. In the preferred embodiment, the information is recorded on 12 sectors in each track.

It should be noted that the above track corresponds to the physical track, but may be a virtual track consisting of a plurality of physical tracks as a single virtual track.

When the information is recorded on a certain track, this track is first scanned to judge whether or not each sector belonging to this scanned sector is either a correct sector, or a defect sector. Thereafter, 12 pieces of the information are sequentially recorded only on the correct sectors in the order of the smaller sector number. That is to say, if there are defect sectors, then the information is recorded on the succeeding correct sector after jumping these defect sectors. Such a recording method can be also applied to the preliminary sectors.

As a result, if no defect sector is present in the sectors numbered by 1 through 12, 12 pieces of the information are sequentially recorded on the correct sectors while the preliminary sectors numbered by 13, 14 and 15 remain non-use.

When a defect sector exists in the sectors numbered by 1 to 12, the 12th piece of information is recorded on the preliminary sector numbered 13, if this preliminary sector 13 is correct. If, however, this preliminary sector 13 is a defect, the information will be recorded on the succeeding sector 14.

As is apparent from the above description, if there are three defect sectors in the sectors numbered from 1 to 12 and all of three preliminary sectors are correct ones, 12 pieces of the information can be recorded on the corresponding single track. It is therefore determined by the probability of occurrence of the defect sectors as to how many preliminary sectors are prepared on a single track. It should be also noted that the information may be recorded on other tracks which are predetermined, taking account of shortage of the preliminary sectors. However, such a recording method is a departure from the technical scope of the present invention. In the preferred embodiment, three preliminary sectors are sufficient for recording the information in case of the existence of defect sectors.

As precisely described in detail, the information is recorded on the normal sectors and/or the preliminary sectors in accordance with the above-defined substitution recording method, so that the necessary information recorded on the sectors can be acquired as quickly as possible.

Since 12 pieces of the information have been recorded on one track, the total information recorded on the optical disk is 12×20,000 pieces. The logic addresses are sequentially allocated to the information in the recorded order. The logic address directly represents that the information corresponding to this logic address is recorded on the n-th address in the n-th track ("n" is an integer except for zero).

When the information recorded on the K-th addressed sector of the track numbered in "j" is read out, the track number "j" is scanned and the number of the recorded sectors in the scanned track is sequentially counted from the head portion thereof. Then, the information recorded on the sector is produced when the count value corresponds to "K". Since such an addressing process is performed for, at the most, 15 sectors (i.e., one track), a time period required for executing this addressing process is sufficiently short, as compared with the conventional addressing process. In, for instance, the first conventional addressing method, the similar address counting process must be performed for 15×20,000 sector at maximum. As is obvious from the above examples, the averaged accessing time according to the invention can be considerably reduced, as compared with that of the conventional addressing process.

Figure 5:
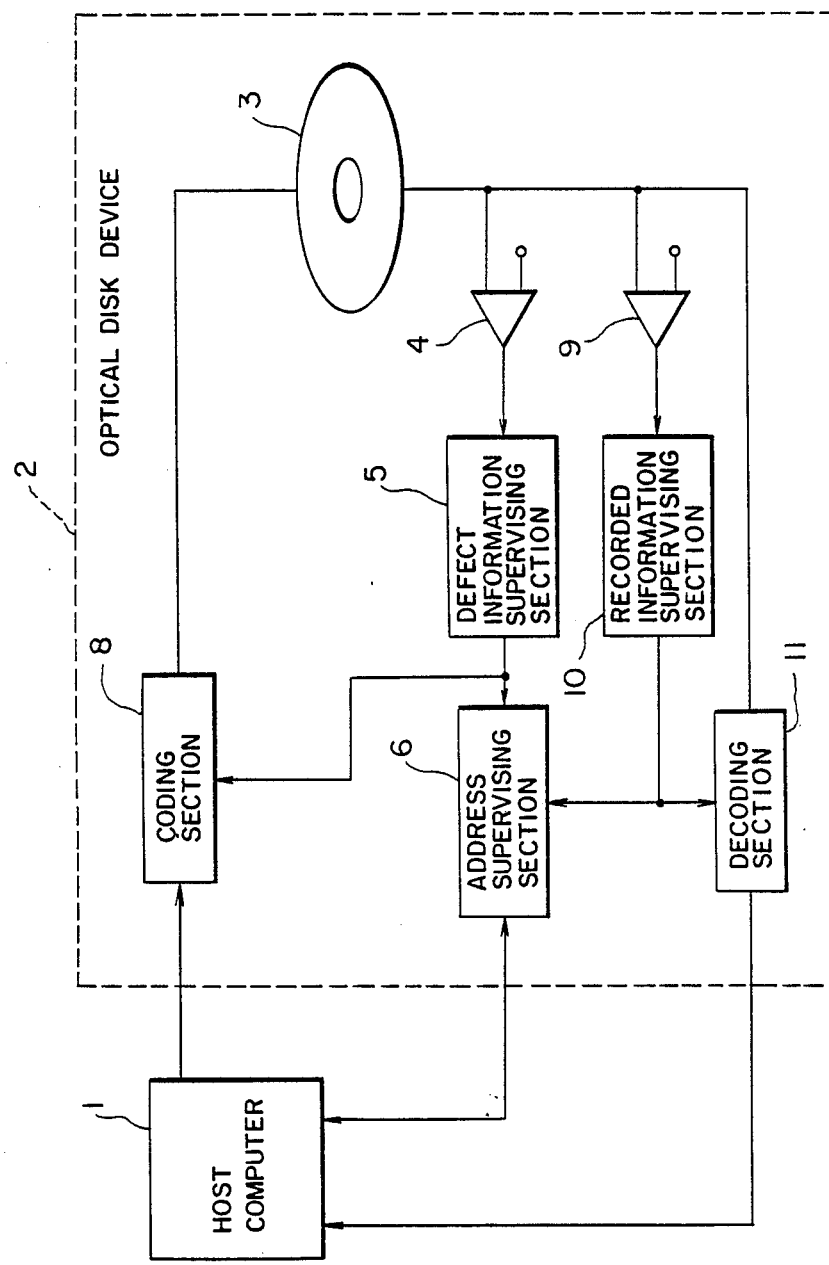

FIG. 5 illustrates a block diagram of a system for embodying the recording/reproducing method according to the invention. Reference numeral 1 denotes a host computer, reference numeral 2 represents an optical disk device and reference numeral 3 indicates an optical disk. When the information is recorded on a certain track (a single track, or plural track) of the optical disk 3, the corresponding region of the optical disk 3 is first scanned to obtain the reproduced outputs. The reproduced outputs are compared with the reference value by a defect judging section 4 so as to divide the comparison results into the correct sector and the defective sector. This sector information is processed in a defect information supervising section 5 and the resultant information is sent to an address supervising section 6. As a result, the defective sector can be recognized in accordance with a predetermined system.

The information to be recorded is sent from the host computer 1 to the coding section 8. In the coding section 8, the input information is coded for the recording purpose and the coded information is supplied to the recording head (not shown). Under these conditions, the recording addresses are controlled in the address supervising section 6 based upon the logic address transferred from the host computer 1 and the above-described defect information. As previously described, the coded information is sequentially recorded while jumping over the defect sector.

When the information of the logic address designated by the host computer 1 is reproduced, the track containing this designated logic address is first scanned under the control of the address supervising section 6. Then, the reproduced output is compared with the reference value in a recorded information judging section 9. The resultant value is processed in a recorded information supervising section 10, so that the number of the recorded sectors contained in the corresponding track is counted. The counted value is input into the address supervising section 9. When the counted value reaches a predetermined recorded sector, the reproduced output of the information recorded on this sector is processed in a decoding section 11 so as to produce the reproduced signal in the original signal form. Thereafter, the reproduced signal is transferred to the host computer 1.

As previously described in detail, in the recording method according to the present invention, the verify system is applied thereto as one supervising unit mainly consisting of a plurality of continuous tracks, the optical disk is no longer rotated so as to perform the seek operation when the recording operation is changed into the reproducing check operation, and the time period required to perform a series of the information recording sequential operation can be considerably reduced, as compared with that of the conventional recording method.

In accordance with the reproducing method of the invention, the defect position information of the recording medium does not need to be systematically stored and supervised. Moreover, the information can be handled based upon the logic address at the host computer, and also the averaged access time can be significantly shortened so that the necessary information can be quickly acquired while the simple preprocessing is effected during the recording and reproducing operations.

While the present invention has been described using a specific preferred embodiment, it should be understood that further modifications and changes can be made without departing from the scope of the present invention.

What is claimed is:

1. A method of recording data on an optical disc, said optical disc having a plurality of concentric tracks, each of said tracks being subdivided into a plurality of sectors, said method comprising the steps of:

designating, for each of said tracks, at least one of said sectors as preliminary sectors and designating the remaining sectors as user sectors;

recording basic data on said user sectors;

reproducing data from said user sectors;

comparing said basic data with said reproduced data to thereby identify defective user sectors;

recording data corresponding to said defective user sectors on said preliminary sectors.

2. A method of recording data on an optical disc as claimed in claim 1, further comprising the step of identifying a leading sector of user sectors of a first track during said step of recording data on said preliminary sectors of a second track.

* * * * *